(12) United States Patent
Kim

(10) Patent No.: US 7,228,107 B2
(45) Date of Patent: Jun. 5, 2007

(54) PAGING INDICATOR DECIDING METHOD OF MOBILE COMMUNICATION TERMINAL

(75) Inventor: Te-Hyun Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 286 days.

(21) Appl. No.: 10/896,853

(22) Filed: Jul. 23, 2004

(65) Prior Publication Data
US 2005/0020292 A1 Jan. 27, 2005

(30) Foreign Application Priority Data
Jul. 25, 2003 (KR) ........................ 10-2003-0051522

(51) Int. Cl.
H04B 17/00 (2006.01)
(52) U.S. Cl. .................. 455/67.13; 455/67.11; 455/515; 370/335; 375/141
(58) Field of Classification Search ................ 455/574, 455/458, 226.2, 726.1, 513, 464
See application file for complete search history.

(56) References Cited

U.S. PATENT DOCUMENTS 7,072,380 B2 * 7/2006 Ozluturk et al. ............ 375/141
7,123,600 B2 * 10/2006 Ozluturk et al. ............ 370/335
2003/0008691 A1 * 1/2003 Chen et al. .................. 455/574
2003/0186684 A1 * 10/2003 Kearney et al. ............. 455/411

FOREIGN PATENT DOCUMENTS

KR 2003-0023154 3/2003

* cited by examiner

Primary Examiner—Temica Beamer
Assistant Examiner—Joy Contee
(74) Attorney, Agent, or Firm—Ked & Associates, LLP

(57) ABSTRACT

A paging indicator deciding method of a mobile communication terminal in which a threshold value for deciding a paging indicator is variably set according to a SNR of a pilot channel. If the SNR of the pilot channel is in a range that a false alarm rate (FAR) has a large value, the mobile terminal determines a threshold value so that it can have the greatest value in a range that a miss probability (MP) does not exceed the standard value. If the SNR of the pilot channel is not in the range that the SNR has the large value, the mobile terminal determines a threshold value to obtain the smallest MP in a range that the FAR is not further increased.

19 Claims, 5 Drawing Sheets

PAGING INDICATOR DECIDING METHOD OF MOBILE COMMUNICATION TERMINAL

CROSS-REFERENCE TO A RELATED APPLICATION

This application claims priority to Korean Patent Application No. 51522/2003 filed on Jul. 25, 2003, the entire contents of which is hereby incorporated in its entirety.

BACKGROUND OF THE INVENTION

1. Field of the Invention

The present invention relates to a paging indicator deciding method of a mobile terminal, and more particularly to variably setting a threshold value used to determine whether or not a paging indicator indicates a page message exists.

2. Background of the Related Art

One method for reducing a standby time (battery usage time) of mobile terminals is referred to as a slotted mode. In this example, a base station transmits information to a corresponding mobile terminal at a predetermined time (a corresponding slot). The mobile terminal then switches from a sleep mode (sleep state) to an idle mode (idle state) at the corresponding slot time to determine and checks whether or not there is information being transmitted to the mobile terminal. The mobile terminal operates in the sleep mode for times other than the slotted times.

Further, to page the mobile terminal, a mobile communication system transmits a page message in a corresponding slot of a paging channel. Also transmitted is a page indicator indicating the existence or non-existence of a page message. Accordingly, the mobile terminal periodically switches from the sleep mode to the idle mode to search for the paging indicator. If the paging indicator indicates the existence of the page message, the mobile terminal receives and demodulates the page message.

In addition, the mobile terminal does not immediately demodulate the page message at each corresponding time slot, but rather searches the paging indicator to determine if the page message needs to be demodulated. Thus, because the time slot for the page message has a length of, for example, 20 ms, and the paging indicator only has a length of, for example, 1 ms, processing of the page message is reduced.

Further, two paging indicators are generally transmitted in one slot and the mobile terminal demodulates one of the two paging indicators to decide whether the paging indicator is '0', '1', or 'erasure' (1). Turning now to FIG. 1, which illustrates a method for demodulating the page message.

The determination of a paging indicator to be '0' means that the paging indicator has not been transmitted. On the contrary, the determination of the paging indicator to be a '1' means that the paging indicator has been transmitted. In addition, a value of 'erasure' means determination cannot be made as to whether the paging indicator was transmitted.

Further, if the paging indicator is determined to be '0', the mobile terminal switches from the idle mode to the sleep mode (3). Meanwhile, if the paging indicator is determined to be '1' or 'erasure', the mobile terminal reads the second paging indicator (5). If the second paging indicator is determined to be '0', the mobile terminal switches to the sleep mode (3). If, however, the second paging indicator is determined to be a '1' or the 'erasure' value, the mobile terminal receives and demodulates the page message (7). In other words, if at least one of the two paging indicators is determined to be '0', the mobile terminal switches to the sleep mode, and if both paging indicators are determined to be '1' or 'erasure', the mobile terminal receives and demodulates the page message from the paging channel.

Further, comparing the following paging indicator Signal-to-Noise Ratio (SNR) estimate value (paging indicator $E_b/N_o$) and a pilot channel SNR estimate value (pilot channel $E_b/N_o$) to a threshold value may be used to determine the value of the paging indicator. The following equation illustrates such a comparison:

$$\begin{cases} \text{"1", if } \dfrac{PagingIndicator \dfrac{E_b}{N_o}}{PilotChannel \dfrac{E_b}{N_o}} \geq \text{threshold value } (\xi) \\ \text{"0", otherwise} \end{cases} \quad (1)$$

Namely, if the ratio between the paging indicator SNR estimate value and the pilot channel SNR estimate value is smaller than a threshold value ($\xi$), the mobile terminal determines the paging indicator to be a '0', or otherwise, the mobile terminal determines the paging indicator to be a '1'. FIG. 2 is a graph showing a relation between the above-noted threshold value, a false alarm rate (FAR) and a miss probability (MP) according to the threshold value. The FAR indicates a probability that the paging indicator is determined to be '1' or 'erasure' even though it is '0', and the MP indicates a probability that the paging indicator is determined to be '0' even through it is actually '1'.

Further, the threshold value $\xi$ is set low to reduce the amount of MPs. However, a small threshold value $\xi$ produces more FARs. Similarly, increasing the threshold value $\xi$ reduces the amount of FARs, but increases the amount of MPs. In addition, receiving too many FARs results in the mobile terminal consuming more battery power by attempting to demodulate paging messages that are false alarms.

SUMMARY OF THE INVENTION

Accordingly, one object of the present invention is to at least address the above-noted and other problems.

Another object of the present invention is to optimize a standby time and incoming probability of a mobile communication terminal by effectively deciding a paging indicator.

Yet another object of the present invention is to variably set a threshold value for deciding a paging indicator according to a SNR of a pilot channel.

To achieve at least the above objects in whole or in parts, the present invention provides a novel paging indicator deciding method of a mobile terminal including comparing a ratio between a paging indicator SNR estimate value and a SNR estimate value of a pilot channel with a threshold value, and variably setting the threshold value according to the SNR of the pilot channel.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

BEST MODE OF THE INVENTION

Figure 1:
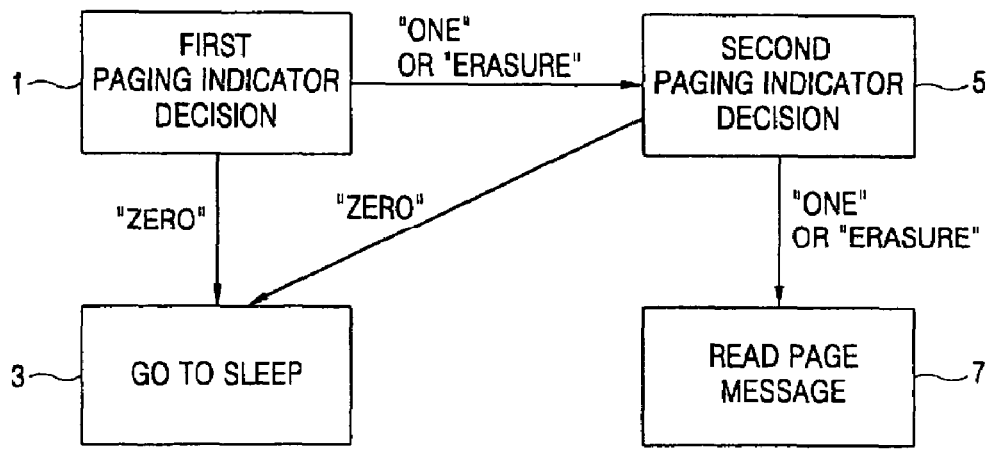
FIG. 1 illustrates a method for demodulating a page message based on a paging indicator of a general mobile terminal.
Figure 2:
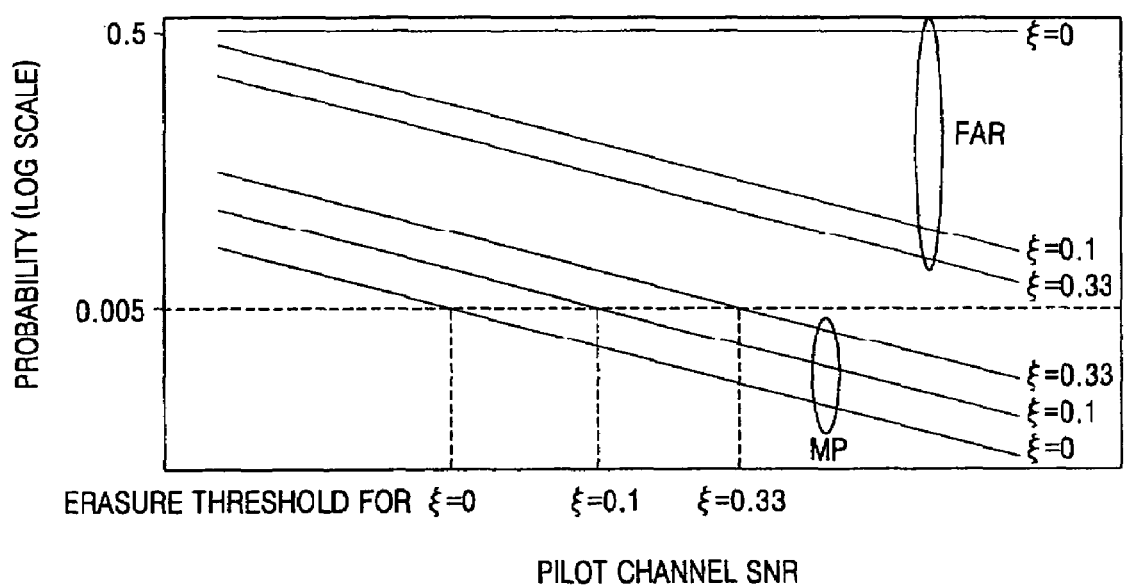
FIG. 2 is a graph showing a relation between a determined threshold value, a FAR and a MP according to the threshold value.

Referring now to the drawings, the present invention will be described.

Figure 3:
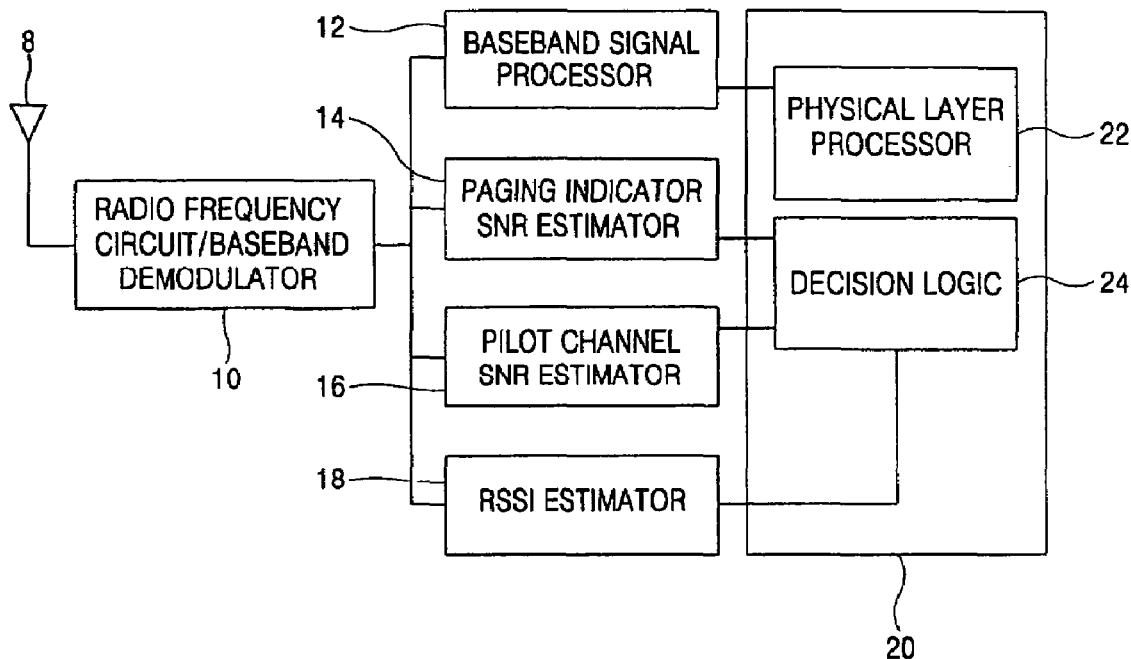
FIG. 3 is a block diagram illustrating a paging indicator deciding apparatus of a mobile terminal.

FIG. 3 is a block diagram illustrating an example of a paging indicator deciding apparatus for a mobile terminal. As shown, the apparatus includes a radio frequency circuit/baseband demodulator 10 for converting a RF signal received through an antenna 8 into a baseband signal and demodulating the baseband signal, a baseband signal processor 12 for converting the demodulated baseband signal into a physical layer PDU (Protocol Data Unit), and a paging indicator SNR estimator 14 for estimating an SNR ($E_b/N_o$) of the paging indicator demodulated in the radio frequency circuit/baseband demodulator 10. Also included is a pilot channel SNR estimator 16 for estimating a SNR of a pilot channel demodulated in the RF circuit/baseband demodulator 10, a RSSI (Received Signal Strength Indicator) estimator 18 for estimating a RSSI of a paging indicator channel received through the RF circuit/baseband demodulator 10, and a central processing unit (CPU) 20 for deciding whether a paging indicator indicates to demodulate the page message.

Further, as shown, the CPU 20 includes a physical layer processor 22 for changing a physical layer PDU to a physical layer SDU (Service Data Unit), and a decision logic unit 24 for determining whether to select a mode for demodulating the page message or select a mode for deciding if the paging indicator indicates to demodulate the page message.

Figure 4:
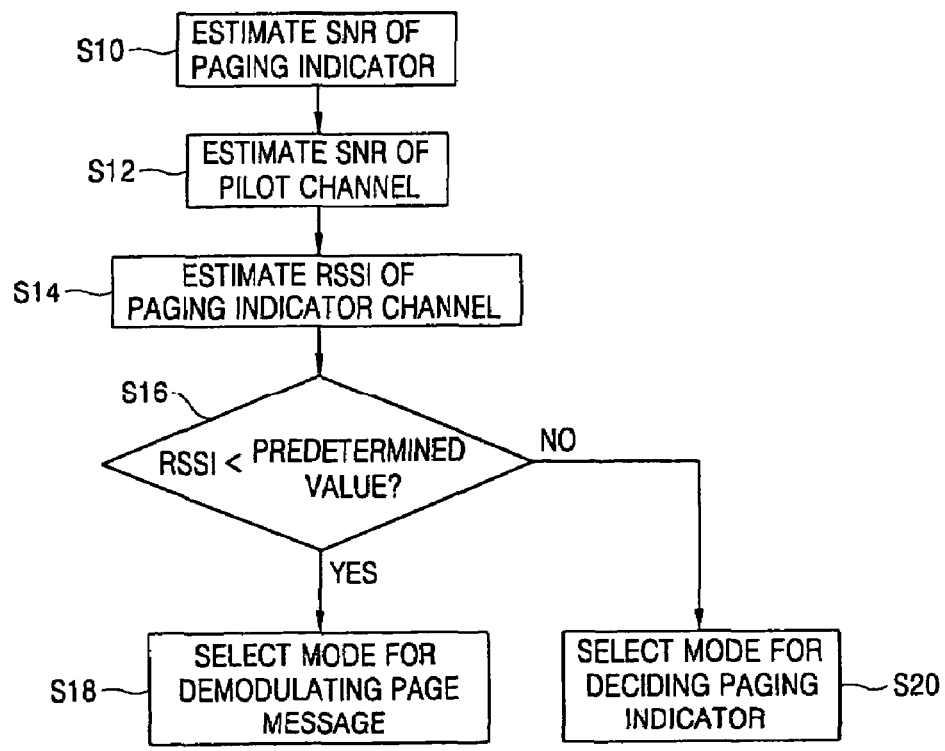
FIG. 4 is a flowchart illustrating a paging indicator deciding method of a mobile terminal.

The operation of the paging indicator deciding apparatus of the above-noted mobile terminal will now be further described with reference to FIGS. 3 and 4. The RF circuit/baseband demodulator 10 converts a received paging indicator signal, which has been modulated to a RF carrier, into a baseband signal and demodulates the signal. The demodulated paging indicator signal is then transmitted to the paging indicator SNR estimator 14, and the paging indicator SNR estimator 14 estimates a SNR of the paging indicator, namely, $E_b/N_o$ (one bit energy-to-background noise power ratio). The estimated paging indicator SNR is then provided to the decision logic unit 24 (step S10).

The pilot channel signal which has been demodulated by the RF circuit/baseband modulator 10 is transmitted to the pilot channel SNR estimator 16, and the pilot channel SNR estimator 16 estimates a SNR ($E_b/N_o$) of the pilot channel.

The estimated SNR of the pilot channel is also provided to the decision logic unit 24 (step S12).

The RSSI estimator 18 estimates a RSSI, namely, an average Ec/Io (average energy of one chip-to-total received output power ratio) of the received paging indicator channel, and provides the estimated RSSI of the paging indicator channel to the decision logic unit 24 (step S14).

If the RSSI of the paging indicator channel is smaller than a predetermined value (Yes in step S16), the decision logic unit 24 selects a mode for demodulating the page message (step S18), and if the RSSI of the paging indicator channel is not smaller than the predetermined value (No in step S16), the decision logic unit 24 selects a mode for deciding a paging indicator (step S20).

If the mode for deciding a paging indicator is selected, the decision logic unit 24 of the mobile terminal decides the value of the paging indicator with reference to the above-noted equation (1) using the paging indicator SNR provided by the paging indicator SNR estimator 14 and the pilot channel SNR provided by the pilot channel SNR estimator 16.

In the present invention, the threshold value (ξ) is variably set based on the SNR value of the pilot channel. That is, if the SNR of the pilot channel is low, it is more likely the paging indicator will be greater than the threshold value (ξ), resulting in more FARs being detected. Accordingly, the present invention variable sets the threshold value (ξ). This advantageously reduces the amount of FARs, thereby reducing the amount of unnecessary demodulation processing and thus saving standby time of the mobile terminal.

In addition, according to the present invention, an "erasure" decision value is generally not used. If, however, the threshold value (ξ) is smaller than '0' and thus the FAR exceeds 50%, for example, the decision is insignificant, so the value of paging indicator can be decided as 'erasure'. In this respect, if a probability that a specific value, namely the FAR, exceeds 20%, for example, the mobile terminal directly receives a page message, rather than using the paging indicator. Thus, there is little possibility that a value of 'erasure' is generated.

Further, the paging indicator deciding method according to the present invention will now be further described. In the present invention, the mobile terminal determines the threshold value (ξ) so that the MP has a greatest value in a range but does not exceed an arbitrary standard value, namely, a maximum standard value ($MP_{MAX}$). In one example, the standard value ($MP_{MAX}$) is preferably set as 0.005 or 0.001.

To determine the threshold value (ξ), a probability distribution function is used. Further, the probability distribution function indicates a distribution of a probability variable 'x' expressed as equation (2) when the paging indicator is decided as '1':

$$x = \frac{PagingIndicator \frac{E_b}{N_o}}{PilotChannel \frac{E_b}{N_o}} \quad (2)$$

Figure 5:
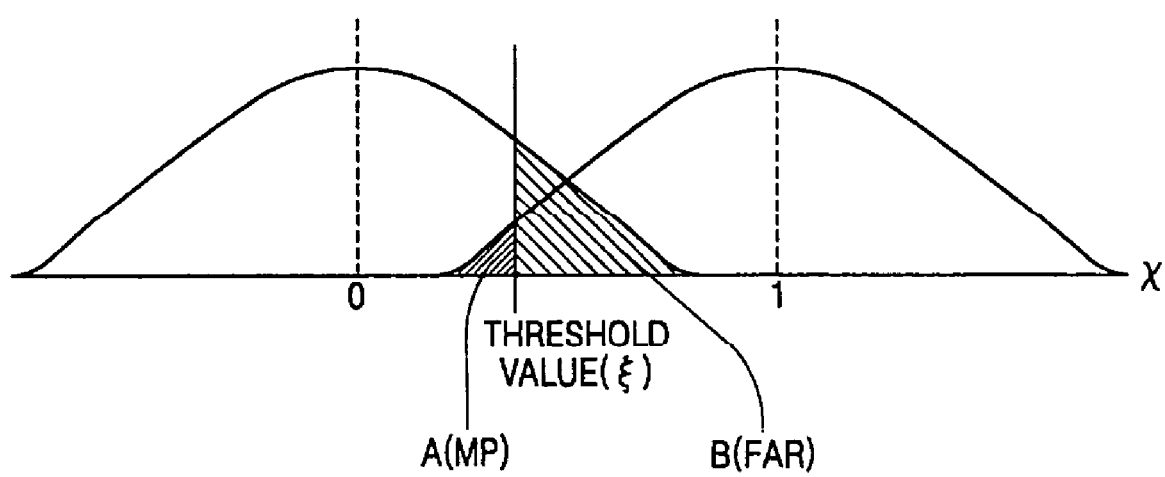
FIG. 5 is a graph illustrating a probability distribution function for a probability variable 'x'.

Turning now to FIG. 5, which illustrates a probability distribution function for the probability variable 'x'. The distribution of 'x' is a result obtained from experimentation and as shown has a normalized distribution with a uniform average. A region denoted by 'A' indicates a MP and a region denoted by 'B' indicates a FAR.

The mobile terminal generates a probability distribution function for the probability variable 'x', and if the standard value ($MP_{MAX}$) is 0.005, the mobile terminal determines a threshold value ($\xi$) of the probability distribution function according to the SNR of the pilot channel so that the MP can have the highest value within a range of not exceeding 0.005. A standard deviation of the normalized distribution increases as the SNR of the pilot channel is reduced.

Figure 6:
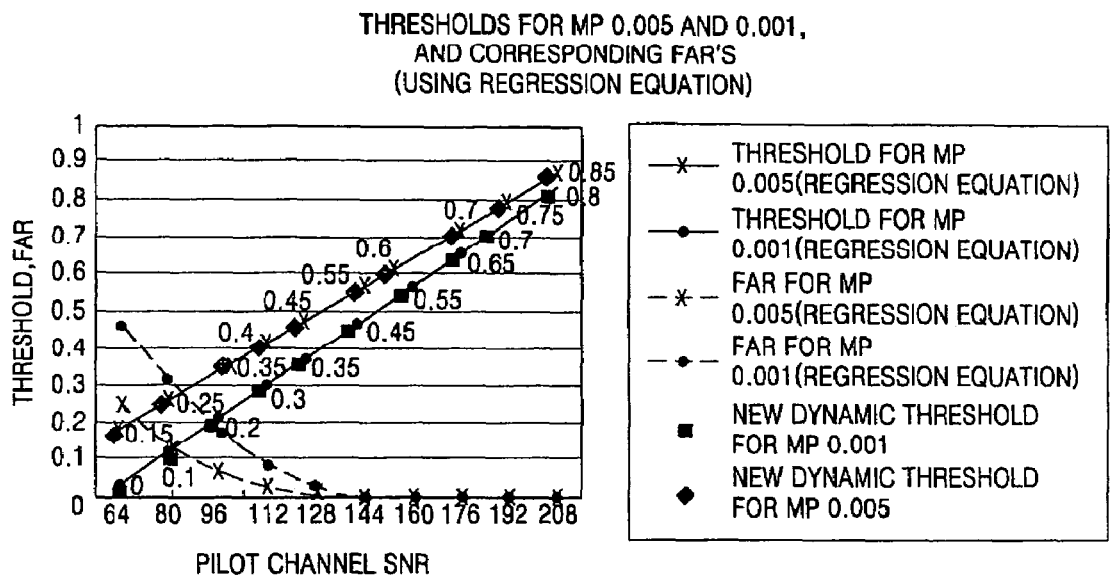
FIG. 6 is a graph illustrating a relation among a SNR of a pilot channel, a threshold value (ξ) and a FAR when the threshold value is determined to reduce the FAR according to the present invention.

FIG. 6 is a graph showing a relation among a SNR of a pilot channel, a threshold value ($\xi$) and a FAR when the standard values of MP are 0.005 and 0.001, respectively. As shown in FIG. 6, according to the present invention, the threshold values become greater as the pilot channel SNR increases. For example, when MP is 0.005, if the pilot channel SNR is 80, the threshold value is 0.25, if the pilot channel SNR is 96, the threshold value is 0.35, and if the pilot channel SNR is 192, the threshold value is 0.75.

In addition, as shown in FIG. 6, if the threshold value is determined so the MP is equal to the standard value ($MP_{MAX}$), the FAR is reduced as the pilot channel SNR is increased. Further, if the threshold value is increased above a specific value, the FAR becomes substantially 0%. For example, if the MP standard value ($MP_{MAX}$) is 0.005 and the threshold value is 0.45 or above, the FAR is substantially 0%.

Figure 7:
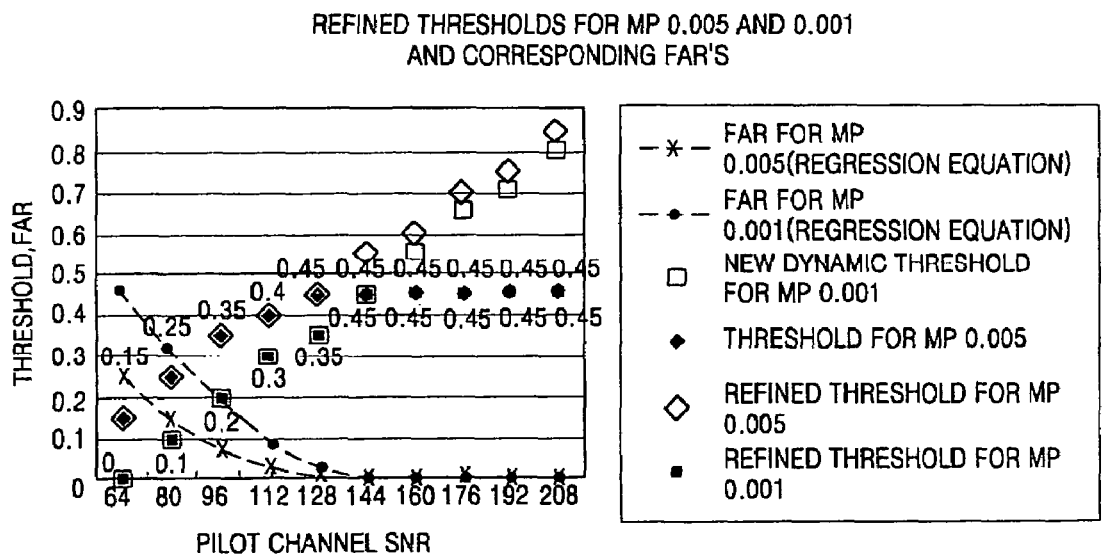
FIG. 7 is a graph illustrating a relation among threshold values refined to reduce a MP in a range where the FAR does not further increase, the FAR and the SNR of a pilot channel.

Next, FIG. 7 is a graph showing threshold values refined to reduce the MP in a range that the FAR does not further increase after the threshold values were determined to have the greatest values within the range that MP does not exceed the standard value ($MP_{MAX}$).

For example, when the MP standard value ($MP_{MAX}$) is 0.005, if the pilot channel SNR is 80, the threshold value is 0.25 and the FAR is 0.15, if the pilot channel SNR is 112, the threshold value is 0.4 and the FAR is 0.05, and if the pilot channel SNR is 128, the threshold value is 0.45 and the FAR is substantially 0.

Further, if the pilot channel SNR is greater than 128, the FAR is substantially 0%. Then, the mobile terminal determines the threshold value to reduce the MP (the portion 'A' in FIG. 5) in a range that the FAR is not further increased, rather than determining the threshold value so the MP is equal to $MP_{MAX}$.

In more detail, in FIG. 6, when the MP standard value ($MP_{MAX}$) is 0.005, if the pilot channel SNR is 128, the threshold value is determined to be 0.45, if the pilot channel SNR is 160, the threshold value is determined to be 0.6, and if the pilot channel SNR is 192, the threshold value is determined to be 0.75.

Figure 8:
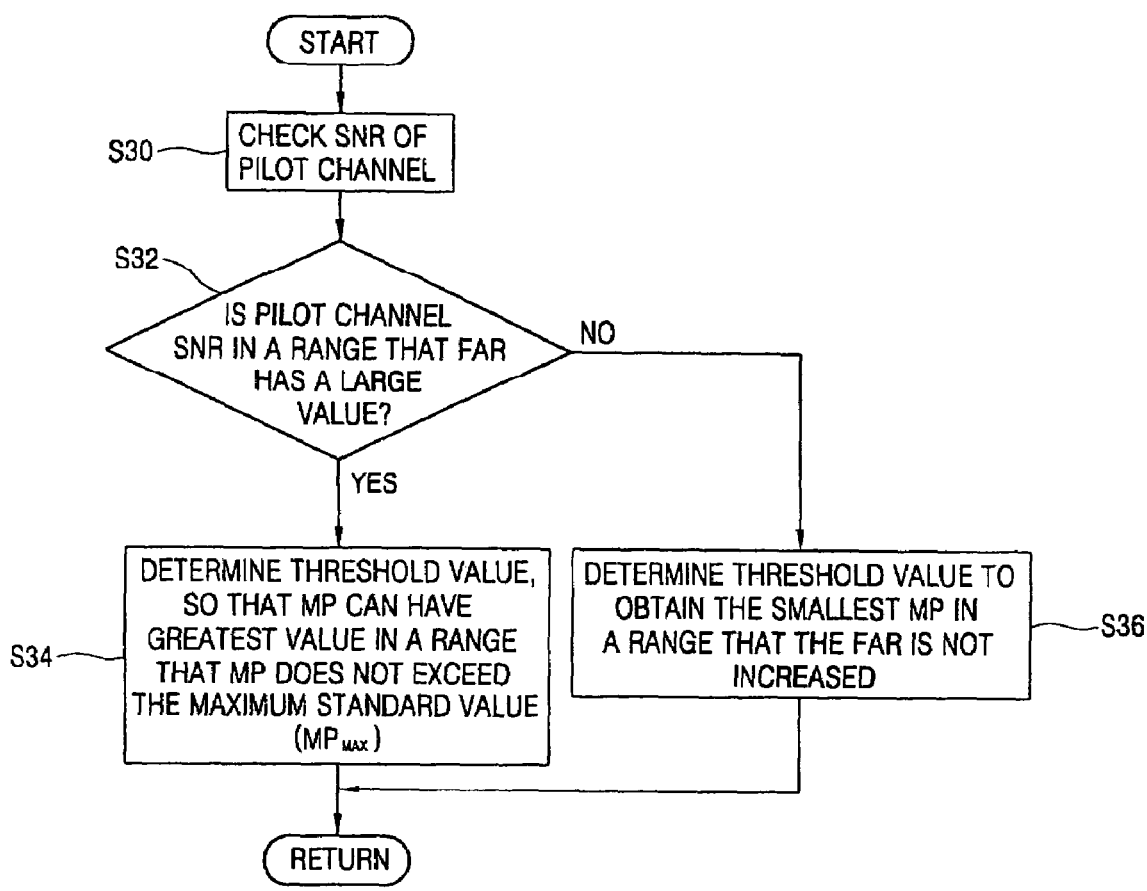
FIG. 8 is a flowchart of a paging indicator deciding method of a mobile communication terminal according to the present invention.

However, in FIG. 7, when the MP standard value ($MP_{MAX}$) is 0.005, if the pilot channel SNR is 128, 160 or 192, the threshold value is determined to be 0.45. Namely, if the pilot channel SNR is greater than 128, the FAR is substantially 0%, so the mobile terminal determines the threshold value as 0.45 (namely, the threshold value when the pilot channel SNR is 128, so that the MP can be reduced to less than 0.005). Next, FIG. 8 is a flowchart of a paging indicator determining method according to the present invention. As shown, the mobile terminal checks a SNR of a pilot channel (step S30).

If the checked SNR of the pilot channel is in a range that the FAR has a large value (Yes in step S32), the mobile terminal determines a threshold value so that a MP can have the greatest value in a range that the MP does not exceed the standard value ($MP_{MAX}$) (step S34).

Further, the mobile terminal checks the pilot channel SNR and a FAR at the determined threshold value, and if the checked FAR exceeds 20%, for example, the mobile terminal switches from a paging indicator decision mode to a page message demodulation mode. If, however, the checked FAR does not exceed 20%, for example, the mobile terminal maintains the current paging indicator decision mode. Thus, in the present invention, the paging indicator is not decided to be the value 'erasure'.

If the SNR of the pilot channel checked in the step S32 is not in the range that the SNR has the large value (No in step S32), namely, if the SNR of the pilot channel belongs to a range that the FAR has a value close to 0%, the mobile terminal determines a threshold value to obtain the smallest MP in a range that the FAR is not further increased (step S36).

Thereafter, when the mobile terminal is operated in the mode for deciding the paging indicator, the mobile terminal compares a ratio between the paging indicator SNR estimate value (paging Indicator $E_b/N_o$) and the pilot channel SNR estimate value (pilot channel $E_b/N_o$) with the determined threshold value.

If the ratio between the paging indicator SNR estimate value and the pilot channel SNR estimate value is not smaller than the threshold value, the mobile terminal determines the paging indicator to be a 1, and if the ratio is smaller than the threshold value, the mobile terminal determines the paging indicator to be a 0.

As so far described, the paging indicator deciding method of the present invention has the following advantages.

That is, for example, because the threshold value for deciding the paging indicator is variably set according to a SNR of the pilot channel, the MP and the FAR are reduced and the paging indicator can be effectively and accurately decided.

In addition, because the paging indicator is accurately decided, the standby time and incoming probability of the mobile communication is optimized.

This invention may be conveniently implemented using a conventional general purpose digital computer or microprocessor programmed according to the teachings of the present specification, as well be apparent to those skilled in the computer art. Appropriate software coding can readily be prepared by skilled programmers based on the teachings of the present disclosure, as will be apparent to those skilled in the software are. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method for determining a paging indicator of a mobile terminal, comprising:

comparing a ratio between a paging indicator SNR (Signal-to-Noise Ratio) estimate value and a pilot channel SNR estimate value with a threshold value;

variably setting the threshold value based on a SNR of the pilot channel; and determining a probability distribution function based on a ratio between the paging indicator SNR estimate value and the pilot channel SNR estimate value, wherein the threshold value is determined so that a Miss Probability (MP) has a greatest value in a range that the MP does not exceed a maximum standard value.

2. The method of claim 1, wherein the maximum standard value is 0.005 or 0.001.

3. The method of claim 1, wherein, when the pilot channel SNR estimate value is in a range that a False Alarm Rate (FAR) is smaller than a predetermined value, the threshold value is determined so a smallest MIP is obtained in a range that the FAR does not further increase.

4. The method of claim 3, wherein the predetermined value is 0.

5. The method of claim 1, wherein if the pilot channel SNR estimate value is in a range that a False Alarm Rate (FAR) is increased greater than a predetermined value, the mobile terminal switches to a mode for demodulating a page message.

6. The method of claim 5, wherein the predetermined value includes 20%.

7. A method for determining a paging indicator of a mobile terminal, comprising:

variably setting a threshold value used to determine whether or not the paging indicator indicates to demodulate a page message based on a SNR (Signal-to-Noise Ratio) of a pilot channel; and determining a probability distribution function based on a ratio between a paging indicator SNR value and the pilot channel SNR value, wherein the threshold value is determined so that a Miss Probability (MP) has a greatest value in a range that the MP does not exceed a maximum standard value.

8. The method of claim 7, further comprising:

comparing a ratio between the paging indicator SNR value and the pilot channel SNR value with the threshold value.

9. The method of claim 7, wherein the maximum standard value is 0.005 or 0.001.

10. The method of claim 7, wherein, when the pilot channel SNR value is in a range that a False Alarm Rate (FAR) is smaller than a predetermined value, the threshold value is determined so a smallest MP is obtained in a range that the FAR does not further increase.

11. The method of claim 10, wherein the predetermined value is 0.

12. The method of claim 7, wherein if the pilot channel SNR value is in a range that a False Alarm Rate (FAR) is increased greater than a predetermined value, the mobile terminal switches to a mode for demodulating a page message.

13. The method of claim 12, wherein the predetermined value includes 20%.

14. A mobile terminal, comprising:

a threshold unit configured to variably set a threshold value used to determine whether or not a paging indicator indicates to demodulate a page message based on a SNR (Signal-to-Noise Ratio) of a pilot channel;

a paging indicator SNR unit configured to estimate a SNR of the paging indicator;

a pilot channel SNR unit configured to estimate a SNR of a pilot channel; and a processor configured to compare a ratio between the paging indicator SNR and the pilot channel SNR with the threshold value, wherein the processor determines a probability distribution function based on a ratio between the paging indicator SNR and the pilot channel SNR, and wherein the threshold value is determined so that a Miss Probability (MP) has a greatest value in a range that the MP does not exceed a maximum standard value.

15. The mobile terminal of claim 14, wherein the maximum standard value is 0.005 or 0.001.

16. The mobile terminal of claim 14, wherein, when the pilot channel SNR is in a range that a False Alarm Rate (FAR) is smaller than a predetermined value, the threshold value is determined so a smallest MP is obtained in a range that the FAR does not frirther increase.

17. The mobile terminal of claim 16, wherein the predetermined value is 0.

18. The mobile terminal of claim 14, wherein if the pilot channel SNR value is in a range that a False Alarm Rate (FAR) is increased greater than a predetermined value, the mobile terminal switches to a mode for demodulating a page message.

19. The mobile terminal of claim 18, wherein the predetermined value includes 20%.

* * * * *